May 23, 1950
H. H. KUHLEMEIER
ELECTRIC MOTOR CONTROL APPARATUS
WITH FEEDBACK ANTIHUNTING MEANS
Filed Sept. 26, 1945
2,508,640
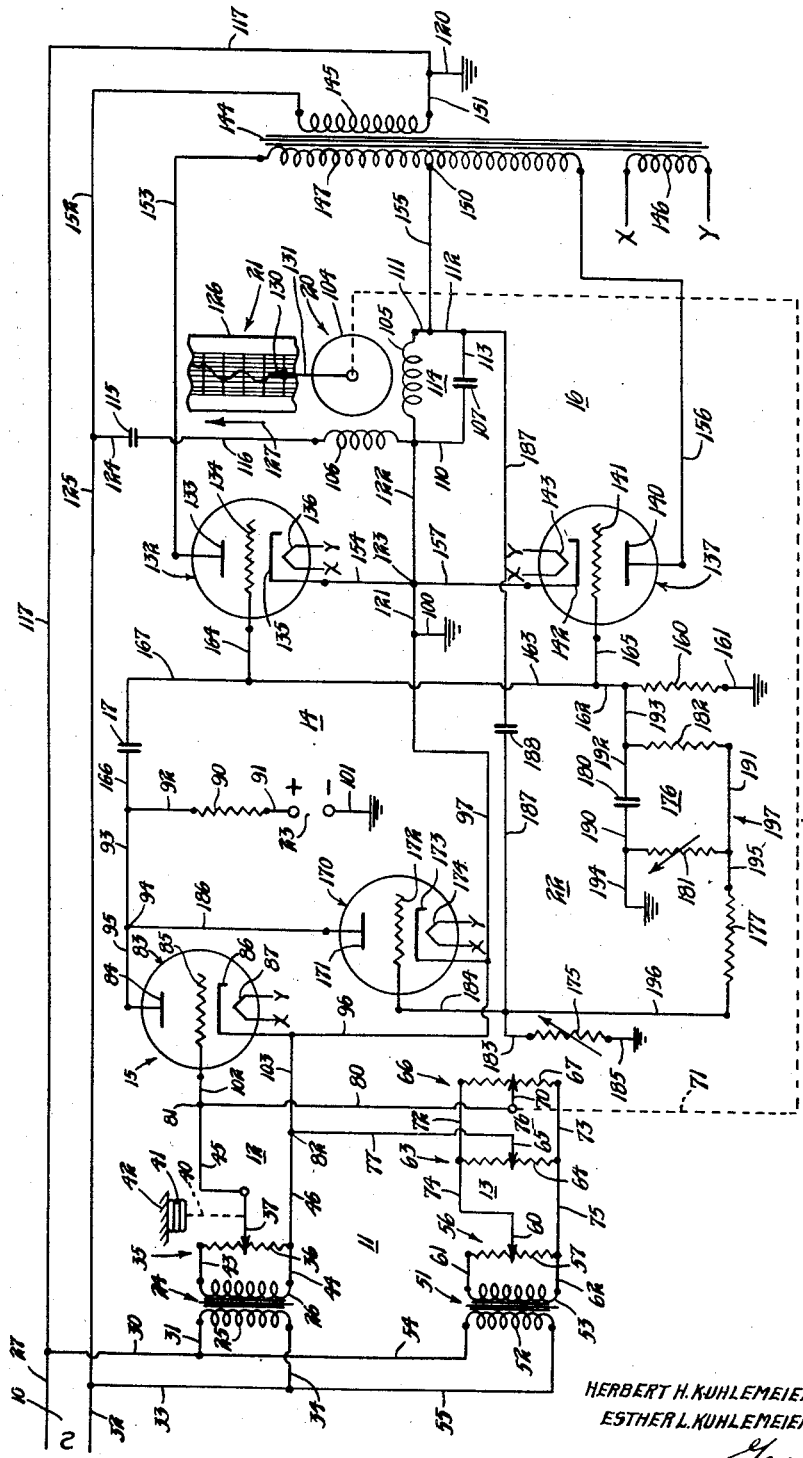
INVENTOR
HERBERT H. KUHLEMEIER DECEASED
ESTHER L. KUHLEMEIER, ADMINISTRATRIX
BY George H. Fisher
ATTORNEY Patented May 23, 1950

2,508,640

UNITED STATES PATENT OFFICE 2,508,640

ELECTRIC MOTOR CONTROL APPARATUS WITH FEEDBACK ANTIHUNTING MEANS

Herbert H. Kuhlemeier, deceased, late of Minneapolis, Minn., by Esther L. Kuhlemeier, administratrix, Minneapolis, Minn., assignor to Minneapolis-Honeywell Regulator Company, Minneapolis, Minn., a corporation of Delaware Application September 26, 1945, Serial No. 618,735

15 Claims. (Cl. 318—28)

1

This invention relates to the field of electrical motor control apparatus. One application for such motor control apparatus is in connection with recorders and more particularly recorders in which the variable to be recorded is effective to vary a resistance and thus to unbalance an electric bridge, while the motor which actuates the recording pen is effective to vary a second resistance and thus to rebalance the bridge. In such arrangements frequent trouble is experienced by hunting and overshooting of the recorder; that is, the inertia of the recorder motor carries it past the point at which balance of the bridge takes place. This not only results in an inaccurate record, but also causes a reverse signal to be given by the bridge. This energizes the motor for operation in the opposite direction, as a result of which it may again overshoot so that there arises a condition of continual oscillation of the motor about an intermediate position.

It is an object of the invention to provide a new and improved anti-hunting system.

It is a further object of the invention to provide an electrical network in which the effect of a signal voltage is modified by that of a regulating voltage in accordance with the magnitude of the signal.

Yet another object of the invention is to provide a "rebalancing" type motor control apparatus in which a signal voltage varying in response to a condition is balanced out by a second voltage varying with operation of the motor and in which the effect of the signal voltage is modified by that of a "velocity" voltage, varying with the speed of the motor.

Various other objects, advantages, and features of novelty which characterize the invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which is illustrated and described a preferred embodiment of the invention.

Construction

The single figure of the drawing is a diagrammatic showing of a preferred embodiment of the invention. In the figure, a source 10 of alternating current is shown to energize a normally balanced composite network 11. Network 11 comprises a sensing or condition responsive network 12, which provides a first voltage output varying with the condition, and a rebalancing network 13, which provides a second voltage output varying with the operation of a motor presently to be described. The voltage outputs of networks 12 and 13 are impressed in parallel upon the input of an amplifier 14 including an amplifier stage 15, in which simple voltage amplification takes place, and a discriminator stage 16, whose input is connected to the output of the amplifier stage through a coupling capacitor 17 and whose output is used, in conjunction with source 10, to energize a squirrel-cage motor 20. Operation of motor 20 is effective, through any suitable mechanism, to actuate a recorder 21, and also to vary the output of rebalancing network 13 as previously set forth. The invention is further shown to comprise an anti-hunt circuit 22 which integrates a pair of voltages derived from the input and output of the discriminator stage, and which adds to the output of the amplifier stage a voltage of a phase which is effective to oppose the instantaneous discriminator output, only if the voltage derived from the input to the discriminator stage is below a predetermined adjustable level. Amplifier stage 15 and anti-hunt circuit 22 include electron discharge devices having a common source 23 of unidirectional anode potential. The detailed structure of each of the principal components just recited will now be set forth.

Sensing network 12 is shown to comprise a transformer 24 having a primary winding 25 and a secondary winding 26. Primary winding 25 is energized from source 10 through conductors 27, 30, and 31 and conductors 32, 33, and 34. The function of transformer 24 is to energize a potential divider 35 having a uniform resistance winding 36 and a contacting slider 37. Slider 37 is shown as actuated by a link 40 connected to the free end of a bellows 41 which expands and contracts with changes in pressure, the opposite end of bellows 41 being rigidly supported as at 42. The construction of bellows 41 is such that movement of slider 37 along winding 36 under its influence is substantially linear with pressure. It will be appreciated, however, that the invention is adapted to use in connection with any other variable which can be arranged to cause actuation of slider 37 with respect to winding 36.

The constant output voltage of secondary winding 26 is impressed upon resistance winding 36 by conductors 43 and 44, and of this voltage a portion determined by the position of slider 37 appears on conductors 45 and 46, connected respectively to slider 37 and one terminal of winding 36. From the above recited structure it follows that sensing network 12 delivers to conductors 45 and 46 an alternating voltage of fixed frequency, whose amplitude varies with pressure, and whose phase with respect to the output of transformer 25 is fixed.

Rebalancing network 13 is shown to comprise a transformer 51 having a primary winding 52 and a secondary winding 53. It is preferred to make transformer 51 electrically identical with transformer 24. Primary winding 52 is energized from source 10 through conductors 27, 30, and 54 and conductors 32, 33, and 55. The function of transformer 51 is to energize a potential divider 56 having a uniform resistance winding 57 and a contacting slider 60, which is manually adjustable with respect to winding 57. The constant output voltage of secondary winding 53 is impressed upon resistance winding 36 by conductors 61 and 62.

Rebalancing network 13 also includes a second potential divider 63, having a uniform resistance winding 64 and a contacting slider 65, and a third potential divider 66, having a uniform resistance winding 67 and a contacting slider 70. Slider 65 of divider 63 is manually adjustable with respect to winding 64, while slider 70 of divider 66 is actuated by a shaft 71 in a manner presently to be described. Windings 64 and 67 are connected in parallel by conductors 72 and 73. Of the voltage impressed upon resistance winding 57 of divider 56, a portion determined by the position of slider 60 is impressed upon resistance windings 64 and 67 by conductors 74 and 75, connected respectively to slider 60 and one terminal of winding 57.

It will be observed that potential dividers 63 and 66 cooperate to form a Wheatstone bridge 76 in which the portions of each divider above and below the slider comprise two adjacent arms. The bridge is energized by conductors 74 and 75, and a pair of conductors 77 and 80 connected respectively to sliders 65 and 70 comprise the output terminals of the bridge. It is preferable to make the resistances of resistance windings 64 and 67 equal; therefore, according to the well known principle of resistance bridges, if sliders 65 and 70 are equally displaced from the ends of their respective windings connected to the same input terminal, there is no potential difference between the sliders, while if the sliders are unequally displaced, a potential difference appears between the sliders which varies in magnitude with the amount of the relative displacement and which reverses in phase, with respect to the input voltage, with reversal of the direction of relative displacement. It also follows that for any amount of unbalance of the bridge the output voltage varies with the input voltage.

From the above recited structure it follows that, for any given setting of sliders 60 and 65, rebalancing network 13 delivers to conductors 77 and 80 an alternating voltage of fixed frequency, whose amplitude varies with the amount of displacement between sliders 65 and 70, and whose phase, with respect to the output of transformer 51, reverses with reversal in the direction of displacement between sliders 65 and 70. It also follows that the magnitude of output voltage resulting from a given magnitude of displacement between the sliders may be varied by adjustment of potential divider 56, and that the position of slider 70 at which the bridge balances may be varied by adjustment of potential divider 63. Potential divider 56 will therefore be referred to as the "ratio" adjustment, and potential divider 63 will be referred to as the "centering" adjustment.

Conductor 45 of sensing network 12 and conductor 80 of rebalancing network 13 are connected at junction point 81, and conductor 46 of sensing network 12 and conductor 77 of rebalancing network 13 are connected at junction point 82. The voltage between points 81 and 82 is accordingly the resultant of the voltage between conductors 45 and 46 and that between conductors 80 and 77. If the two voltages to be added are of equal amplitude and are 180° out of phase, the voltage between points 81 and 82 becomes zero: this is the "balanced" condition of composite network 11. Since transformers 24 and 51 are electrically identical, the voltages impressed upon the windings of potential dividers 35 and 36 are in phase, and therefore the voltages to be combined are either in phase or 180° out of phase, depending on the direction of displacement between sliders 65 and 70.

Amplifier stage 15 is shown to comprise a triode 83 including an anode 84, a grid 85, a cathode 86, and a heater filament 87. The stage also includes a load resistor 90. The anode circuit of triode 83 may be traced from the positive terminal of source 23 through conductor 91, resistor 90, conductors 92 and 93, junction point 94, conductor 95, anode 84, cathode 86, conductors 96 and 97, and ground connections 100 and 101 to the negative terminal of source 23. The resultant voltage appearing at junction points 81 and 82 is impressed between grid 85 and cathode 86 of triode 83 by conductors 102 and 103.

As is well known, the current flowing in the anode circuit of triode 83 varies with the voltage applied between grid 85 and cathode 86, and results in a voltage drop across the load resistance, including the resistance of source 23, which has substantially the wave form of the grid voltage, but is of the opposite phase and of several times the maximum amplitude. It is the function of amplifier stage 15 therefore to provide an output voltage whose amplitude is a multiple of the amplitude of the voltage between junction points 81 and 82 and whose wave form and phase are substantially fixed thereby.

Motor 20 is shown to comprise an armature 104, a first or "line phase" field winding 106 and a second or "amplifier phase" field winding 105. Armature 104 is shown as mounted on a shaft 71, previously referred to as actuating slider 70 of potential divider 66. A capacitor 107 is connected to winding 105, by conductors 110 and conductors 111, 112, and 113, to comprise a parallel circuit 114, and the capacitance of the capacitor is so chosen, with reference to the inductance of winding 105, that the combination is in a condition of parallel resonance for alternating voltage of the frequency of source 10. A capacitor 115 is connected in series with winding 106 by a conductor 116, and the capacitance of this capacitor is so chosen, with respect to the inductance of winding 106, that the voltage drop across the winding is 90° out of phase with that across winding 105.

The parallel circuit including winding 105 is energized from a source presently to be described. The series circuit including winding 106 is energized from source 10 through conductors 27 and 117, ground connections 120 and 100, conductor 121, junction point 123, conductor 122, winding 106, conductor 116, capacitor 115, and conductors 124, 125, and 32.

Recorder 21 is shown to comprise a graduated record sheet 126 maintained in continuous uniform motion in the direction of arrow 127 by any conventional means, not shown, such as a spring motor or an electric motor. A marking member 130, which may for example be an inking pen, a pencil, or a steel point, depending on the type of record being made, is shown as cooperating with record sheet 126, and member 130 is shown as actuated by motor 20 through a suitable arm 131. It will be understood that suitable limit switches, not shown, are provided to interrupt energization of motor 20 if marking member 130 is driven to the extreme graduation on sheet 126, corresponding to an end of resistance winding 67. It will also be understood that such gear reductions as may be desirable are to be inserted between motor 20 and link 131 or slider 70, or both. Motor 20 thus functions to actuate the marking member 130 and at the same time to adjust the position of slider 70 of potential divider 66.

Discriminator stage 16 is shown to comprise a first triode 132 having an anode 133, a grid 134, a cathode 135, and a heater filament 136; a second triode 137 having an anode 140, a grid 141, a cathode 142, and a heater filament 143; and a transformer 144 having a primary winding 145, a first secondary winding 146, and a second secondary winding 147 which is center tapped as at 150. The primary winding of transformer 144 is energized from source 10 as by conductors 27, 117, and 151 and conductors 32, 125, and 152.

One of the functions of transformer 144 is to energize the anode circuits of discriminator stage 16. Thus, the anode circuit of triode 132 may be traced from the upper terminal of secondary winding 147 through conductor 153, anode 133, cathode 135, conductors 154 and 122, parallel circuit 114, and conductor 155 to center tap 150 of the secondary winding. Similarly, the anode circuit of triode 137 may be traced, a half cycle later in the period of source 10, from the lower terminal of winding 147 through conductor 156, anode 140, cathode 142, conductors 157 and 122, parallel circuit 114, and conductor 155 to center tap 150. It will be observed that by these connections the anodes of triodes 132 and 157 are made positive with respect to their cathodes during alternate half cycles of the source, but that the flow of current through parallel circuit 114 including motor winding 105 is in the same direction regardless of which triode has a positive anode and is therefore conducting.

A resistor 160 is provided to function as the input resistor for triodes 132 and 137: one end of this resistor is connected, by ground connections 161 and 100 and conductor 121, to junction point 123, to which cathodes 135 and 142 are connected by conductors 154 and 157, respectively; the other end of resistor 160 is connected to grid 134 of triode 132 by conductors 162, 163, and 164 and to grid 141 of triode 137 by conductors 162 and 165. Any voltage drop across resistor 160 is impressed upon the input circuits of triodes 132 and 137 to control their operation, and thus to control the operation of motor 20 as will presently be described.

The alternating voltage drop across load resistor 90 is impressed upon resistor 160 through conductor 91, source 23, and ground connections 101 and 161 and through conductors 92 and 166, capacitor 17, and conductors 167, 163, and 162. Capacitor 17 is effective to keep continuous current from source 23 from flowing through resistor 160 and thus impressing an undesired constant voltage drop upon the input of the discriminator circuit.

Anti-hunt circuit 22 is shown to comprise a triode 170 having an anode 171, a grid 172, a cathode 173, and a heater filament 174; a grid resistor 175; and a resistance-capacitance network 176 including a fixed resistor 177, a capacitor 180, a variable resistor 181, and a fixed resistor 182. Resistor 175 is connected between grid 172 and cathode 173 by conductors 183 and 184 and by ground connections 185 and 100 and conductor 97. Any voltage drop in resistor 175 is therefore impressed upon the input circuit of triode 170. The anode circuit of triode 170 may be traced from the positive terminal of source 23 through conductor 91, resistor 90, conductors 92 and 93, junction point 94, conductor 186, anode 171, cathode 173, conductor 97, and ground connections 100 and 101 to the negative terminal of source 23. Thus the voltage drop across resistor 90 is affected by triode 170 as well as triode 83.

Two voltage drops are impressed upon grid resistor 175. The first is that across motor winding 105, and this voltage is impressed upon resistor 175 by conductors 122 and 121 and ground connections 100 and 185, and by conductor 187, coupling condenser 188 and conductors 189 and 183. The second voltage drop is derived from resistance-capacitance network 176 as will now be described.

Capacitor 180, variable resistor 181, and fixed resistor 182 are connected in a closed series circuit, conductor 190 joining capacitor 180 with resistor 181, conductor 191 joining resistors 181 and 182, and conductor 192 joining capacitor 180 and resistor 182. Conductor 192 is connected to the ungrounded terminal of resistor 160 by conductor 193: conductor 190 is grounded by ground connection 194; and conductor 191 is connected to the ungrounded terminal of resistor 175 by conductor 195, resistor 177, and conductors 196 and 183. From the structure just recited it follows that the voltage drop across resistor 160 is also impressed across capacitor 180, and that resistors 181 and 182 comprise a voltage divider 197, connected across capacitor 180 and regulating the portion of the voltage drop across capacitor 180 which is impressed through resistor 177 upon grid resistor 175.

A second function of transformer 144 is to energize the filaments of triodes 83, 132, 137, and 170: this is accomplished from secondary winding 146 of the transformer through conductors X and Y, which have been broken away to avoid unnecessary complication of the drawing.

By way of illustration there is appended a tabulation of the circuit constants of one successful embodiment of the invention: operation of the invention is not, however, to be considered as limited to any single set of specific values for the circuit components thereof.

| | |
|---|---|
| Anode voltage | 50 volts |
| Line voltage | 115 volts |
| Output of transformer 24 | 15 volts |
| Output of transformer 51 | 15 volts |
| Output of winding 147 of transformer 144 | 800 volts center-tapped |
| Output of winding 146 of transformer 144 | 6.3 volts |
| Potential divider 35 | 1,000 ohms |
| Potential divider 56 | 1,000 ohms |
| Potential divider 63 | 10,000 ohms |
| Potential divider 66 | 10,000 ohms |
| Variable resistor 175 | 1,000 ohms |
| Variable resistor 181 | 30,000 ohms |
| Fixed resistor 90 | 250,000 ohms |
| Fixed resistor 177 | 10,000 ohms |
| Fixed resistor 182 | 3 megohms |
| Fixed resistor 160 | 1 megohm |
| Capacitor 17 | 0.03 microfarad |
| Capacitor 180 | .0005 microfarad |
| Capacitor 115 | 0.1 microfarad |
| Capacitor 107 | 0.1 microfarad |
| Capacitor 188 | 0.001 microfarad |
| Tube 15 | 7F7 |
| Tube 170 | 7F7 |
| Tube 132 | 7N7 |
| Tube 137 | 7N7 |

It will be noted that in the embodiment of the invention for which details are given above, use has been made of twin triodes instead of individual triodes as shown in the drawing. The form of illustration used in the drawing was resorted to intentionally for purposes of clarity of presentation.

*Operation*

It will be more conducive to an understanding of the invention if the discussion of its operation begins with motor 20. Although any even number of electrical poles may be used in motor 20, as is well known in the art, for convenience the motor is illustrated as having two electrical poles which in practice comprise four mechanical poles spaced by 90 mechanical degrees. If the two windings of this motor are energized by voltages in quadrature, the motor operates in a first direction or in the opposite direction, depending on which of the two voltages leads and which lags.

The first electrical pole of motor 20 includes "line phase" winding 106: this winding is energized directly from source 10 through series capacitor 115. The voltage drop across the winding leads the current through the winding, and hence the voltage of the source, by approximately 90 degrees, the exact angle being determined by the ohmic resistance and the inductive reactance of the winding.

The second electrical pole of motor 20 includes "amplifier phase" winding 105: this winding is energized by discharge of triode 132 or triode 137. Since the plate-to-cathode impedance of either of these triodes is purely resistive, inter-electrode capacitances again being negligible, the voltage drop across winding 105 is substantially in phase with the secondary voltage. Let it be assumed that transformer 144 is so wound and connected that the lower terminal of secondary winding 147 is negative when the upper terminal of primary winding 145 is positive. By this arrangement the left-hand terminal of winding 105 is positive when anode 133 is positive, and is again positive a half cycle later when anode 140 is positive. Thus, with respect to the voltage of source 10, which is impressed upon primary winding 147, the voltage across winding 105 reverses in phase depending on whether triode 132 or triode 137 is discharging.

From the above it results that motor 20 is energized for forward or reverse operation depending on whether triode 132 or 137 is conducting at the time. The means whereby selective control of the discharge of triodes 132 and 137 is attained will now be described.

As is well known, any voltage impressed on the input of amplifier stage 15 appears, magnified in amplitude and reversed in phase, across the load impedance of the stage. Thus, during a portion of a cycle of alternating current, applied to the input stage, when the grid potential is passing through a positive maximum with respect to ground, the potential of the upper terminal of load resistor 90, and hence of the grids 134 and 141 of triodes 132 and 137, is passing through a positive maximum with respect to ground. At the same time, the anode of one of the discriminator triodes 132 and 137 is positively energized as will be pointed out: that triode therefore discharges for a half cycle, energizing winding 105. During the ensuing half cycle, the anode of the triode is negative, and the triode cannot discharge. The anode of the other triode is positive during this ensuing half cycle, but the grid is negative so discharge of this triode is prevented as well. There results a half wave discharge of one of the discriminator tubes having a component of the energizing frequency and of sufficient power to cause operation of motor 20 in conjunction with source 10 as previously described.

If the phase of the alternating voltage impressed on the input of the amplifier stage is reversed, the phase of the output voltage, impressed on grids 134 and 141, also reverses. The grids are this time negative when the anode of the discriminator tube just referred to as discharging is positive, and vice versa, and accordingly discharge of this triode is prevented. The anode of the other discriminator tube is positive when its grid is positive, however, and this again results in a half wave discharge of the same nature as that previously described, but of the other discriminator tube.

The discharge of the discriminator triodes through winding 105 is effective, as previously outlined, to cause operation of motor 20 as long as winding 106 is continuously energized. The method of obtaining a voltage on the input of the amplifier stage which is either in phase or 180° out of phase with that on the anodes of the discriminator triodes will now be explained.

The load on secondary winding 26 is purely resistive, the inter-electrode capacitance of triode 83 being negligible, and the same is true of the load on secondary winding 53. Transformers 24 and 51 may therefore be considered purely resistive loads on source 10 as far as any phase distortion between the current and voltage of the source is concerned, and the secondary voltages are in phase with one another and with the voltage supplied from secondary winding 147 to the anode of one of the discriminator triodes. The anode voltage supplied to the other triode is 180 degrees out of phase therewith. The voltage impressed on the input of amplifier stage 15 is reversed in phase under the control of bellows 41, in the following fashion.

No voltage is impressed upon the input to amplifier stage 15 in the "normal" condition of the system. This occurs when the voltage supplied to junction points 81 and 82 by conductors 45 and 46 is exactly balanced by that supplied by conductors 77 and 80. The two voltages must therefore be equal in amplitude and opposite in phase, and bridge 76 must remain unbalanced if the system as a whole is to be in balance. The figure illustrates the invention in an "unbalanced" condition rather than in the normal condition. All the sliders are shown at the centers of their respective windings. The voltage between conductors 45 and 46 is accordingly one half the secondary voltage of the transformer. The voltage between conductors 74 and 75 is also one half the secondary voltage of the transformer, and this voltage is supplied to bridge 76. Since sliders 65 and 70 are equally displaced along their respective windings, however, no voltage appears between conductors 77 and 80, and accordingly the full condition responsive voltage is effective upon the amplifier stage.

Let it be assumed that transformers 24 and 51 are so wound and connected that the lower secondary terminals of both transformers are positive for any half cycle when the upper terminals of the primary windings of the respective transformers are positive: the identified terminals will of course all be negative during the ensuing half cycle. Then, in the adjusting relation of sliders and windings shown in the figure, conductor 74 is at the same potential as conductor 45, and conductor 75 is at the same potential as conductor 46. This, incidentally, is independent of the resistances of windings 26 and 53.

A consideration of the relations thus far recited makes it evident that there is no point to which slider 70 can be moved along winding 65 such that the voltage between conductors 80 and 77 is equal in magnitude and opposite in phase with that between conductor 45 and conductor 46. For let slider 70 be moved downwardly so that its potential with respect to slider 65 is of the same phase as that of the potential of conductor 75 with respect to conductor 74: this results in a voltage being impressed between conductors 80 and 77 which is of the opposite phase to that between conductors 45 and 46, and the further downward slider 70 is displaced the greater the amplitude of the opposing voltage. However, even when slider 70 has been moved downward until it contacts conductor 73 directly, the voltage can never have more than half the amplitude of that applied to the bridge, due to the position of slider 65, and a portion of the voltage supplied to conductors 45 and 46 is accordingly impressed upon the input to amplifier stage 15.

Suppose now that the system is again set into operation, but with slider 60 set at the top of winding 57 in contact with conductor 61. The voltage between conductors 74 and 75 is now twice that between conductors 45 and 46, and downward displacement of slider 70 provides to conductors 80 and 77 a voltage which, as slider 70 contacts conductor 73, is equal in magnitude and opposite in phase with that between conductors 45 and 46. As a result, no voltage appears between junction points 81 and 82.

It should now be clear that slider 37 may be permitted to move along no more than the lower half of winding 26 for movement of bellows 41 within its designed limits of operation. The position of slider 37 shown in the drawing is therefore that of maximum pressure on bellows 41. As the pressure diminishes, slider 37 moves downward, decreasing the amplitude of the voltage supplied to junction points 81 and 82 from secondary winding 26 so that the position of slider 70 along winding 67 at which the voltage between conductors 80 and 77 is equal to that between conductors 45 and 46 moves upward along the winding, until, when slider 37 is in contact with conductor 44, the required position of slider 70 corresponds to that of slider 65.

The maximum voltage output from bridge 76 is obtained when sliders 65 and 70 are at the opposite extreme ends of their respective windings. It is preferred, however, that slider 65 be set near the center of winding 64. If this is done, the maximum voltage obtainable from the bridge is half the applied voltage. The gear ratios between motor 20 and slider 70 and arm 131, respectively, are preferably so chosen that slider 70 is moved from one end of winding 67 to the other end while marking member 130 is being moved from the lowest to the highest pressure graduation on the record sheet. Since this movement should take place for movement of link 40 between its extreme positions, an adjustment of some sort to compensate for manufacturing differences among elements designed for use in this system must be provided. It is preferred that this compensation be made as follows.

An ambient pressure in the center of its range is applied to bellows 41, slider 60 being at the top of its winding, and slider 65 is adjusted until the system comes to rest with member 130 resting on the graduation indicating the median pressure. Application of maximum and minimum pressures to bellows 41 should then operate motor 20 to its limit switches in opposite directions. However, by moving slider 60 away from the upper terminal of winding 57, the voltage applied to the bridge may be reduced so that the change in voltage due to responsive movement of slider 37 by bellows 41 is equal in magnitude to the change in voltage due to motor operation of slider 70, but the voltages are out of phase. If slider 60 is too high motor 20 fails to operate through its full range when link 40 moves throughout its whole range, if slider 60 is too low the same movement of link 40 results in excessive motor travel.

The anti-hunt feature of the invention operates as follows: alternating current flowing through coupling capacitor 17 has a plurality of parallel paths to ground, one through capacitor 180, one through resistors 182 and 181, one through resistor 160, one from the grid to the cathode of triode 132, one from the grid to the cathode of triode 137, and one through resistors 182 and 175. When the grids are positive with respect to the cathodes, the tubes act as rectifiers and have a relatively low impedance, compared to the impedances of the other paths. Accordingly, only a small flow of current takes place in the other paths, and only a small voltage appears across capacitor 180, the ungrounded plate being positive with respect to the grounded plate.

During the ensuing half cycle, when the grids are negative, the tube rectifiers have a high impedance and a larger flow of current takes place through the alternate paths, one of which includes capacitor 180. This results in the appearance of a voltage across the capacitor, the ungrounded plate this time being negative with respect to the grounded plate: this voltage is larger than that produced in the first half cycle. The opposing voltage arising during the ensuing repetition of the first half cycle is similarly smaller, and in the second repetition of the second half cycle the condenser is still further charged with its ungrounded plate positive. This charge cannot be dissipated through the rectifiers, because it is of the wrong polarity, and it is not discharged by leakage through resistors 181 and 182, resistors 181 and 175 or resistor 160 because the resistances of the resistors are so chosen that the time constant of the resultant resistor-capacitor combinations with capacitor 180 is greater than a half cycle of the alternating voltage. By this means, a negative bias is established between grids 134 and 141 and ground, and a portion of the bias determined by the value of resistor 181 appears across grid resistor 175 of triode 70, biasing grid 172 increasingly negative with respect to ground as the applied voltage impressed on the discriminator stage increases, regardless of the phase of that voltage. When there is no signal input to the discriminator stage, there is no self-biasing on grid 172.

A signal voltage is impressed across resistor 175: this is the voltage drop across the motor winding 105. This circuit is energized by operation of discriminator stage 16 and results in operation of motor 20. It sometimes happens, however, just as slider 70 is approaching a balanced position and reducing the signal from circuit 11, that the inertia of motor 20 is sufficient to maintain it in rotation at a greater speed than is required by the energy output of the discriminator stage. When this happens, as is well known to those skilled in the art, the motor acts as a generator, drawing power from its inertia and magnetically transferring electrical energy from winding 106 to winding 105. This results in the appearance of a voltage across motor winding 105 and therefore across resistor 175. This voltage acting upon grids 134 and 141 is so phased as to cause energization of motor 20 in a direction to oppose rotation of the motor and so to bring it to a halt.

If there is a signal of appreciable magnitude on grid 85 of triode 83, due to unbalance of circuit 11, negative bias voltage across resistor 175, transmitted through resistor 177, is sufficient to cut off discharge of triode 170, and this voltage increases with the signal from the normally balanced network 11 more rapidly than does the signal from the motor winding 105. Accordingly, discharge of triode 170 is continuously inhibited and the voltage on the input of the discriminator stage is solely that due to the normally balanced circuit 11. To this end, resistors 175 and 181 are both made variable, so that the voltages on the grid of triode 170 are independently adjustable to the desired relation.

The over-all operation of the invention should now be apparent. In the normal condition of the system, motor 20 is not in motion, there is no voltage across the motor winding 105 although winding 106 is energized, the voltage on grid 172 is not sufficient to bias triode 170 to cut-off, slider 60 is adjusted so that the ranges of movement of marking member 130 and of slider 70 are coordinated with the range of movement of slider 37, slider 65 is set so that the scale of sheet 126 is correlated with the pressure on bellows 41, slider 37 is somewhere in the lower half of winding 36 under the influence of ambient pressure on bellows 41, marking member is on the proper graduation of sheet 126, slider 70 is at such a position on winding 67 that no voltage is impressed on the grid of triode 83, and sources 10 and 23 are energized.

Now let the pressure increase. Bellows 41 is compressed, link 40 moves slider 37 upwardly along winding 36 and voltage of a first phase is impressed on grid 83. This results in a voltage drop across resistor 90 which is impressed on discriminator stage 16. A consideration of the circuit shows that for a signal of this phase, the plate and grid of triode 132 are positive at the same time, and winding 105 is energized from the upper half of transformer secondary winding 147. Motor 20 is energized to operate in a first direction, moving marking member 131 across sheet 126 in the direction of larger graduations, and moving slider 70 downward along winding 67. At the same time, a negative bias is derived from the signal fed the discriminator stage, and triode 170 is biased to cut-off before winding 105 is sufficiently energized to exert a controlling effect on grid 172.

Energizing of motor 20 continues until slider 70 takes a position on winding 67 such that the signal on grid 85 is completely neutralized, so that the input to the discriminator stage and hence the self-biasing on grid 172 are both removed. Marking member 130 has by this time reached the scale graduation corresponding to the ambient pressure on bellows 41, but due to its inertia the motor is still rotating. The voltage generated by rotation of the motor is impressed on anti-hunt tube 170 and since the self-bias has been removed this results in a voltage across load resistor 90, energizing grids 134 and 141 of the discriminator stage. The phase of this energizing voltage is opposite to that formerly on the grids, and triode 137 now discharges, energizing motor 20 for movement in the opposite direction and thus quickly bringing the system to its balanced condition.

If the pressure on bellows 41 decreases, the system operates in the reverse manner in every respect, triode 137 energizes motor winding 105 for actuating marking member 130 and slider 70, and triode 132 energizes the winding if anti-hunt action is needed.

Numerous objects and advantages of the invention have been set forth in the foregoing description together with details of the structure and function of the invention, and the novel features thereof are pointed out in the appended claims. The disclosure, however, is illustrative only, and changes may be made in detail, especially in matter of shape, size and arrangement of parts, within the principle of the invention, to the full extent indicated by the broad general meaning of the terms in which the appended claims are expressed.

What is claimed as the invention is:

1. Apparatus of the class described comprising, in combination: source of alternating signal voltage; first and second electron discharge means having a common output impedance; an electric circuit including a load device; means maintaining in said circuit a current which varies in accordance with the voltage across said output impedance; means controlling said first discharge means in accordance with said signal voltage; and means controlling said second discharge means in accordance both with the voltage drop in said output impedance and with the voltage drop in said load device.

2. Apparatus of the class described comprising, in combination: a source of alternating signal voltage; a pair of electric circuits having a common impedance member and separate variably conducting members; an electric circuit including a load device; means maintaining in said circuit a current which varies in accordance with the voltage across said common impedance member; means controlling said first variably conducting member in accordance with said signal voltage; and means controlling said second variably conducting member in accordance both with the voltage drop in said common impedance and with the voltage drop in said load device.

3. Apparatus of the class described comprising, in combination, a signal amplifier and a feedback amplifier separate from the signal amplifier, said signal amplifier and said feedback amplifier having a common output impedance, a motor, a motor control amplifier, means controlling said last named amplifier in accordance with the voltage across said output impedance, means energizing said signal amplifier from a source of signal voltage, and means energizing said feedback amplifier in accordance with the voltage across said motor.

4. Apparatus of the class described comprising, in combination, a signal amplifier and a feedback amplifier separate from the signal amplifier, said signal amplifier and said feedback amplifier having a common output impedance, a motor, a motor control amplifier, means controlling said last named amplifier in accordance with the voltage across said output impedance, means energizing said signal amplifier from a source of signal voltage, and means energizing said feedback amplifier in accordance with the voltage across said output impedance.

5. Apparatus of the class described comprising, in combination, a signal amplifier and a feedback amplifier having a common output impedance, a motor, a motor control amplifier, means controlling said last named amplifier in accordance with the voltage across said output impedance, means energizing said signal amplifier from a source of signal voltage, and means energizing said feedback amplifier in accordance both with the voltage across said motor and with the voltage across said output impedance.

6. Apparatus of the class described comprising, in combination: a source of alternating signal voltage; first and second electron discharge means having a common output impedance; a motor, an electric circuit including further electron discharge means for controlling the flow of current in said motor; means controlling said further electron discharge means in accordance with the voltage drop in said output impedance; means controlling said first discharge means in accordance with said signal voltage; and means controlling said second discharge means in accordance both with the voltage drop in said output impedance and with the voltage drop in said load device.

7. Apparatus of the class described comprising, in combination: a normally balanced electric circuit; means unbalancing and rebalancing said circuit respectively to initiate and interrupt the supply of a signal voltage; a signal amplifier and a feedback amplifier separate from the signal amplifier, said signal amplifier and said feedback amplifier having a common output impedance, a motor, a motor control amplifier, means controlling said last named amplifier in accordance with the voltage across said output impedance; means energizing said signal amplifier with signal voltage, and means connecting said motor to said rebalancing means and to said feedback amplifier for operation and control thereof respectively upon operation of said motor.

8. Apparatus of the class described comprising, in combination: a normally balanced electric circuit; means unbalancing and rebalancing said circuit respectively to initiate and interrupt the supply of a signal voltage; a signal amplifier and a feedback amplifier separate from the signal amplifier, said signal amplifier and said feedback amplifier having a common output impedance, a motor, a motor control amplifier, means controlling said last named amplifier in accordance with the voltage across said output impedance; means energizing said signal amplifier with said signal voltage; variable impedance means applying voltages derived from said output impedance to said feedback amplifier; means connecting said motor to said rebalancing means for operation thereof upon operation of said motor; and means connecting said motor to said feedback amplifier for control thereof jointly with said variable impedance means upon operation of said motor.

9. Apparatus of the class described comprising, in combination: a source of alternating signal voltage; first and second electron discharge means having a common output impedance; an electric circuit including a non-linear load device; means maintaining in said circuit a current which varies in accordance with the voltage across said output impedance; means controlling said first discharge means in accordance with said signal voltage; and means controlling said second discharge means in accordance both with the voltage drop in said output impedance and with the voltage drop in said load device.

10. Apparatus of the class described comprising, in combination, a normally balanced electric circuit, means unbalancing said circuit in response to a condition to give an alternating signal voltage, motor means for rebalancing said circuit, and multistage amplifier means for energizing said motor in accordance with said signal voltage, comprising first degenerative feedback means for applying the voltage at one portion of said amplifier to a preceding portion to stabilize the operation of said amplifier, and second degenerative feedback means for applying the voltage drop across said motor means to the input of one portion of said amplifier to minimize hunting of said motor.

11. Apparatus of the class described comprising, in combination, a normally balanced electric circuit, means unbalancing said circuit in response to a condition to give an alternating signal voltage, motor means for rebalancing said circuit and performing a function coordinated with said condition, and multistage amplifier means for energizing said motor in accordance with said signal voltage, comprising first degenerative feedback means for applying the voltage at one portion of said amplifier to a preceding portion to stabilize the operation of said amplifier and second degenerative feedback means for applying the voltage drop in said motor means to the input of one portion of said amplifier to minimize hunting of said motor.

12. Apparatus of the class described comprising, in combination, a normally balanced electric circuit, means unbalancing said circuit in response to a condition to give an alternating signal voltage, motor means for rebalancing said circuit, and multistage amplifier means for energizing said motor in accordance with said signal voltage, comprising first degenerative feedback means for applying the voltage at one portion of said amplifier to the input of a preceding portion to stabilize the operation of said amplifier, second degenerative feedback means for applying the voltage drop in said motor means to the input of one portion of said amplifier to minimize hunting in said motor, and electron discharge means controlled in accordance with both said degenerative feedback means.

13. Apparatus of the class described comprising, in combination: a first amplifier having an input circuit and an output circuit; a second amplifier separate from said first amplifier having an input circuit and an output circuit; an impedance common to both of said output circuits; motor means operated in accordance with the combined outputs of said amplifiers; means impressing a voltage, determined by a controlling condition, on the input circuit of said first amplifier; and means impressing a voltage, determined by the operation of said motor means, on the input circuit of said second amplifier.

14. Apparatus of the class described comprising, in combination, a signal amplifier and a feedback amplifier separate from the signal amplifier, said signal amplifier and said feedback amplifier having their outputs coupled to a common impedance, a motor, a motor control amplifier, means controlling said last named amplifier in accordance with the voltage across said common impedance, means energizing said signal amplifier from a source of signal voltage, means energizing said feedback amplifier in accordance with the voltage across said motor, and means controlling said feedback amplifier in accordance with a voltage dependent upon the magnitude of the signal voltage so that said feedback amplifier normally has an effect upon said motor only when said signal voltage approaches a predetermined condition at which motor operation is not desired.

15. Apparatus of the class described comprising, in combination: a first amplifier having an input circuit and an output circuit; a second amplifier separate from said first amplifier having an input circuit and an output circuit; an impedance coupled to both of said output circuits; motor means; a motor control amplifier having an input circuit coupled to said impedance and controlling the energization of said motor means in accordance with the combined outputs of said amplifiers; means impressing a signal voltage, determined by a controlling condition, on the input circuit of said first amplifier; means impressing a voltage, determined by the operation of said motor means, on the input circuit of said second amplifier; and means impressing a further voltage determined by said signal voltage on the input circuit of said second amplifier so that said second amplifier normally has an effect upon said motor means only when said signal voltage approaches a predetermined condition at which motor operation is not desired.

ESTHER L. KUHLEMEIER,
*Administratrix of the Estate of Herbert H. Kuhlemeier, Deceased.*

REFERENCES CITED

The following references are of record in the file of this patent:

UNITED STATES PATENTS

| Number | Name | Date |
|---|---|---|
| 2,176,742 | LaPierre | Oct. 17, 1939 |
| 2,209,369 | Wills | July 30, 1940 |
| 2,275,317 | Ryder | Mar. 3, 1942 |
| 2,352,103 | Jones | June 20, 1944 |
| 2,367,869 | Jones | Jan. 23, 1945 |
| 2,376,599 | Jones | Mar. 22, 1945 |
| 2,399,695 | Satterlee | May 7, 1946 |
| 2,446,563 | Upton | Aug. 10, 1948 |